United States Patent [19]

Dakroub

[11] 4,261,015
[45] Apr. 7, 1981

[54] VIDEO CLAMP

[75] Inventor: Housan Dakroub, Dearborn, Mich.

[73] Assignee: Burroughs Corporation, Detroit, Mich.

[21] Appl. No.: 55,968

[22] Filed: Jul. 9, 1979

[51] Int. Cl.³ .................................................. H04N 5/18
[52] U.S. Cl. ................................................. 358/172
[58] Field of Search .................................... 358/172

[56] References Cited

U.S. PATENT DOCUMENTS

| | | | |
|---|---|---|---|
| 3,145,263 | 8/1964 | Barnard | 358/172 |
| 3,159,751 | 11/1960 | Bogdan, Jr. | |
| 3,845,326 | 10/1974 | Godden | 358/172 |
| 3,927,255 | 12/1975 | Yorkanis | 358/172 |
| 4,001,502 | 1/1977 | Van Roessel | |
| 4,110,787 | 8/1978 | Parker | 358/172 |
| 4,143,398 | 3/1979 | Harwood | 358/172 |

*Primary Examiner*—Richard Murray
*Attorney, Agent, or Firm*—Charles E. Quarton; Kevin R. Peterson

[57] ABSTRACT

A video clamp for removing a DC offset voltage component from a video signal to simplify video processing circuitry in an image capture data system includes an input signal having an AC data component on a DC offset voltage and a device for periodically accumulating the DC offset voltage. This offset voltage is maintained on the accumulator by a periodic switching device and an apparatus which also reproduces its input DC voltage at its output. The apparatus is electrically biased with a required supply voltage resulting from a constant difference between DC levels each having the AC data component of the input signal.

8 Claims, 2 Drawing Figures

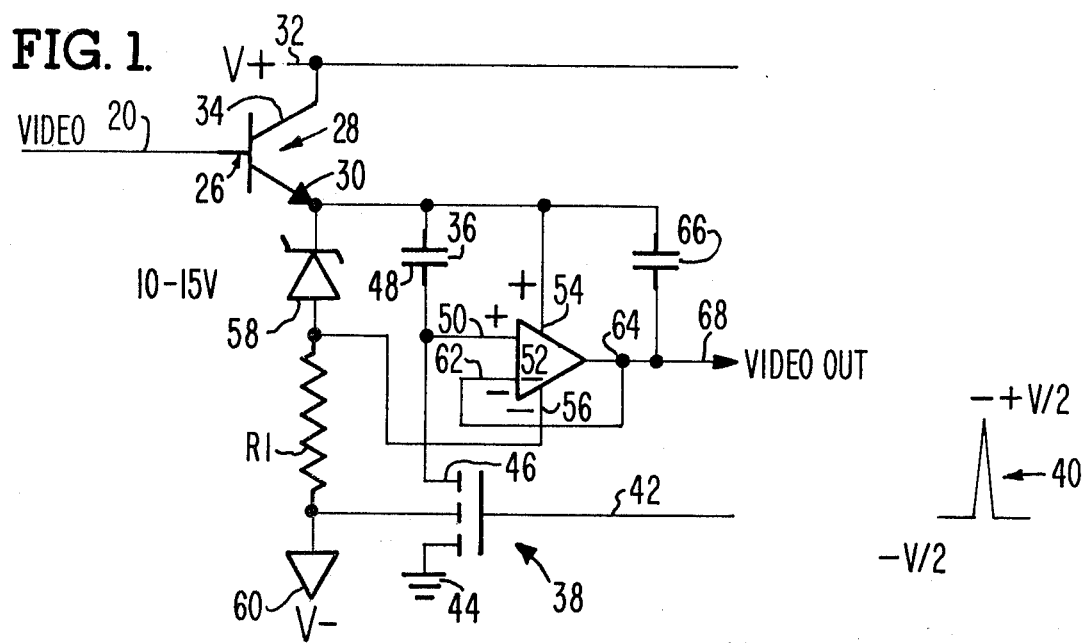
FIG. 1.
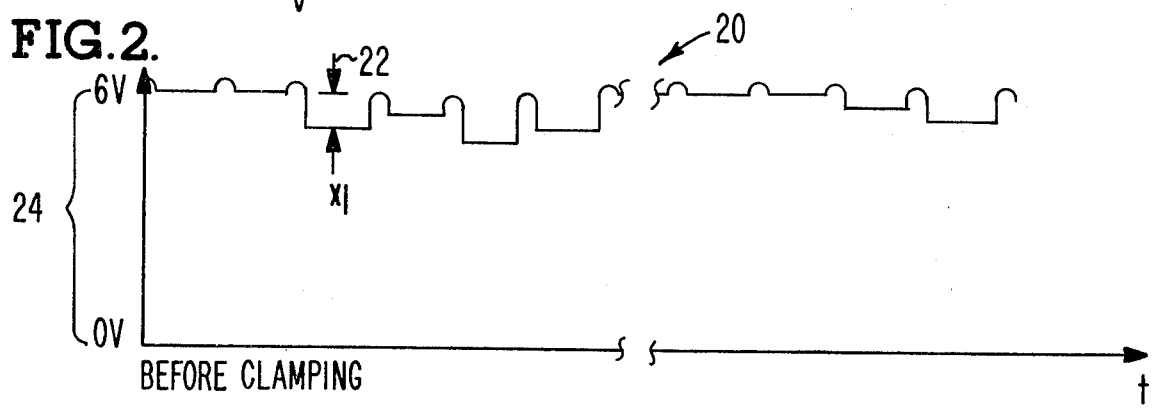
FIG. 2.
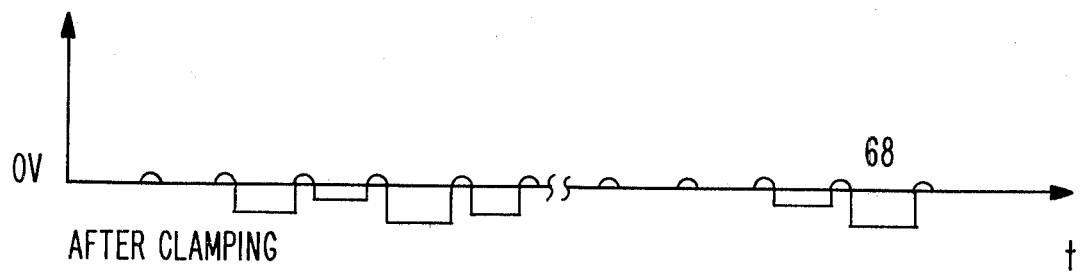
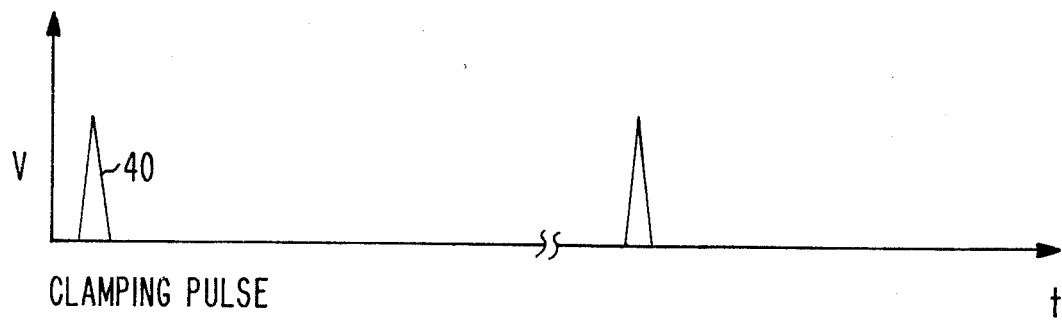

VIDEO CLAMP

BACKGROUND OF THE INVENTION

1. Field of the Invention

This invention relates to a video clamp for removing a DC offset voltage component from a video signal to simplify video processing circuitry in an image capture data system.

2. Description of the Prior Art

In general, video signals have an AC data component on a DC offset voltage and require a video processing system to continually compensate for these temperature and circuitry dependent DC offset voltages. Prior circuits, developed to eliminate the DC offset voltage from a signal having an AC component before subjecting the signal to processing, have taken various approaches. The Bogdan, Jr., et al patent entitled, Clamp Circuit with a Shunt Unilateral Discharge Path, U.S. Pat. No. 3,159,751, patented Nov. 25, 1960, provides a circuit for periodically referencing a conductor to a predetermined voltage level using a diode configured, unidirectional discharge path. However, the circuit's shortcoming is its dependence upon matched diodes and ideal transistors. Without such components, the DC voltage difference between the input and output will vary with temperature. Also, the coupling capacitor 13, used in clamping the AC signal to the desired DC level, will be unable to maintain its charge due to the discharge paths through connected components having less than virtually infinite input impedance.

The Van Roessel patent, Straylight Compensation Circuit and Blanking Circuit for Same, U.S. Pat. No. 4,001,502, patented Jan. 4, 1977, removes an unwanted DC bias voltage component from a video signal and clamps that signal to a desired DC level for further processing. The patented circuit operates over a wide bandwidth of signals and maintains the chosen amount of DC bias voltage better than prior circuits. Nevertheless, this circuit fails to offer the following advantages embodied in the applicant's invention:

1. The applicant's circuit uses fewer and less expensive components and has better DC voltage stabilization at the chosen level.
2. The applicant offers more freedom for chosing the DC level at which an AC signal is clamped, a better response to transients in the AC data signal, and a newer metal-oxide-semiconductor field effect transistor (MOSFET) technology application which eases implementation constraints.

SUMMARY OF THE INVENTION

A video clamp for removing a DC offset voltage component from a video signal to simplify video processing circuitry in an image capture data system is applied to an input signal having an AC data component on a DC offset voltage. A capacitor is periodically charged to the DC offset voltage level by switching the capacitor into a circuit completed by a metal-oxide-semiconductor field-effect transistor (MOSFET). The transistor switches in response to an electronic pulse generated when the AC data component of the input signal indicates no further data is present. When the capacitor is not charging, the virtually infinite input impedance of the MOSFET inhibits the discharge of the capacitor through the transistor.

An operational amplifier is included in the video clamp to accurately reproduce an input DC voltage at the amplifier's output and, due to the amplifier's virtually infinite input impedance, maintain the accumulated charge on the capacitor. The amplifier is electrically biased with required supply voltages by the zener diode. The diode is biased in the reverse direction with a sufficient DC voltage so that the bias DC voltage equals the supply voltage. This bias voltage remains constant since the DC voltages of the input signal and diode bias have the same AC data component and any momentary voltage increase or decrease at one supply voltage source is simultaneously mirrored in the other.

BRIEF DESCRIPTION OF THE DRAWINGS

FIG. 1 is a circuit diagram of a video clamp; and
FIG. 2 depicts the video signal before and after clamping and the clamping pulse.

DETAILED DESCRIPTION

Referring to FIG. 1, a video signal 20 with an AC data component 22 (FIG. 2) on a DC offset voltage 24 enters the base input 26 (FIG. 1) of a high frequency NPN silicon transistor 28. The low power video signal 20 receives current amplification as it leaves the emitter 30 of transistor 28 from the positive voltage source 32 feeding the transistor's collector 34. The current amplified video signal 20 then branches.

A first branch uses the video signal 20 to periodically charge the large valued capacitor 36 (typically 0.1–0.47 $\mu$f) to the video signal's DC offset voltage 24 (FIG. 2). When the metal-oxide-semiconductor field-effect transistor (MOSFET) 38 (SD5200N, manufactured by Signetics Corporation, P.O. Box 9052, Sunnyvale, Calif., 94086) (FIG. 1) is switched by clamping pulse 40 (FIG. 2) entering the gate 42 (FIG. 1) of MOSFET 38, a path to ground 44 through the drain 46 of MOSFET 38 is completed from the bottom 48 of capacitor 36. Clamping pulse 40 (FIG. 2) is periodically generated by a control circuit which clocks a video sensor (not shown) having 1024 sequentially addressed video sensing elements. Certain of those sensing elements do not sense video data when addressed, but instead periodically transmit a video signal which can be considered the null or zero data value.

When MOSFET 38 is switched, the video signal 20 has an uninterrupted circuit to charge capacitor 36 to the DC offset voltage 24 (FIG. 2). If clamping to a different DC offset voltage level is desired, the above technique would still apply, but the drain 46 of MOSFET 38 would be set at the selected DC offset level rather than to ground 44. In the absence of clamping pulse 40 (FIG. 2), the path to ground 44 (FIG. 1) of drain 46 remains virtually open due to the high input impedance (typically $10^{12}$ ohms). Consequently, capacitor 36 will be unable to measurably discharge its DC offset voltage through the unswitched MOSFET 38. As a result, the DC voltage between the capacitor's bottom plate 48 and the MOSFET 38 will be virtually zero and this value, along with the AC data component 22 (FIG. 2), will appear at the input 50 (FIG. 1) to voltage follower operational amplifier 52 (LM310H, manufactured by National Semiconductor Corporation, 2900 Semiconductor Drive, Santa Clara, Calif., 95051). However, as with MOSFET 38, the very high input impedance of amplifier 52 (typically $10^{12}$ ohms) inhibits capacitor 36 from discharging its accumulated DC offset voltage through amplifier 52.

In addition to charging capacitor 36 from the first branch, video signal 20 furnishes a positive level of supply voltage to the positive supply voltage input 54 of amplifier 52. The negative level of supply voltage for amplifier 52 comes from the video signal's path along the second circuit branch from the emitter 30 of transistor 28. Resistor $R_1$ in this path could be a constant current source which would decrease emitter current at peak voltages at the base 26 of transistor 28. This would also decrease instantaneous changes in the difference in voltage from the base 26 to the emitter 30.

Amplifier 52 requires a fixed amount of DC supply voltage which is satisfied by a positive and negative voltage difference equal to this amount. Consequently, the negative level of supply voltage required at the amplifier's negative supply voltage input 56 must be sufficiently below that of the video signal 20 to yield the required voltage difference. Also, the negative supply voltage must contain the identical AC data component 22 (FIG. 2) of the video signal so that the voltage difference remains constant as the video signal's AC data changes. This negative supply voltage is provided by feeding video signal 20 from emitter 30 (FIG. 1) through a zener diode 58 which is biased in the reverse direction by a negative voltage source 60 to yield the required voltage difference. The video signal 20 on the negative biasing voltage is then fed to the amplifier's negative supply voltage input 56.

A result of the video signal's identical AC data component 22 (FIG. 2) being fed to the amplifier's input 50 (FIG. 1) and positive and negative supply voltage inputs, 54 and 56 respectively, is that amplifier 52 detects no AC data component and the level of stray capacitance in this part of the circuit becomes negligible. All the relevant amplifier inputs identically follow the AC data and therefore, there is no relative AC movement of the input. This feature is noteworthy because of the inability of most operational amplifiers like the LM310H to accurately reproduce high frequency input voltages. By eliminating a changing input voltage, the applicant's invention is able to effectively utilize the accurate DC reproduction capability of the amplifier 52. Consequently, amplifier 52, configured as a voltage follower by connecting the amplifier's negative input 62 to the amplifier's output 64, produces A DC voltage level of zero at output 64 due to the lack of voltage between the bottom plate 48 of capacitor 36 and the negative input 50 of amplifier 52.

With the DC voltage output of amplifier 52 now at zero, the video clamp's purpose of eliminating the DC offset voltage from video signal 20 for more simplified circuitry in an image capture data processing system is realized by adding to the zero output the AC data component 22 (FIG. 2). The video signal's first branch leading to capacitor 36 (FIG. 1) and the amplifier's positive supply voltage input 54 also connects to an output capacitor 66. As with capacitor 36, the output capacitor 66 is large (typically 0.1–0.47 $\mu f$) and therefore will pass the AC data component 22 (FIG. 2) of video signal 20 and block the signal's DC offset voltage 24. The video signal 20, minus its DC offset voltage, now appears as the video out signal 68 (FIG. 1) at the amplifier's output 64. The low output impedance of amplifier 52, in contrast to the high output impedance of transistor 28, facilitates using the video out signal 68 by subsequently added circuits of an image capture data processing system. The current gain to the original signal 20, provided by the positive voltage source 32 through transistor 28, is transferred through the amplifier's supply voltage inputs 54 and 56 to the video out signal 68.

What is claimed is:

1. A video clamp for removing a DC offset voltage component from a video signal in an image capture data system comprising:
   means for generating an input signal having an AC and DC component;
   first means for accumulating the DC component and for transmitting the AC component of the input signal;
   means, responsive to the input signal generating means, for discharging the first accumulating means, the discharging means having virtually infinite impedence to current flow during nondischarge of the first accumulating means;
   an operational amplifier to accurately reproduce a DC voltage and to amplify the AC component of the input signal;
   means for biasing the operational amplifier with a constant DC voltage level difference, each DC voltage level having superimposed thereon the AC component of the input signal; and
   second means, cooperative with the operational amplifier, for accumulating the DC component and for transmitting the AC component of the input signal.

2. The invention of claim 1, wherein the means for generating an input signal comprises means for detecting data, and the data detecting means triggering the means for discharging the first accumulating means when a predetermined input signal is generated.

3. The invention of claim 2, wherein the means for detecting data comprises a plurality of data sensing elements, each data sensing element generating an input signal.

4. The invention of claim 1, wherein the first means for accumulating the DC component and for transmitting the AC component of the input signal comprises a capacitor.

5. The invention of claim 1, wherein the means, responsive to the input signal generating means, for discharging the first accumulating means comprises a metal-oxide-semiconductor field-effect transistor.

6. The invention of claim 1, wherein the means for biasing the operational amplifier with a constant DC voltage level difference, each DC voltage level having superimposed thereon the AC component of the input signal comprises:
   a transistor to transmit the AC component; and
   means for transmitting the AC component, offset from the AC component transmitted by the transistor, superimposed on a predetermined DC voltage.

7. The invention of claim 6, wherein the means for transmitting the AC component, offset from the AC component transmitted by the transistor, superimposed on a predetermined DC voltage comprises:
   a zener diode receiving the AC component transmitted by the transistor; and
   means for biasing the zener diode to the predetermined offset DC voltage on which the AC component is superimposed.

8. The invention of claim 1, wherein the second means for accumulating the DC component and for transmitting the AC component of the input signal comprises a capacitor.

* * * * *